E. F. CARSON.
MILK BOTTLE AND CAP.
APPLICATION FILED JUNE 18, 1919.

1,333,245.

Patented Mar. 9, 1920.

WITNESS:
Robt R Mitchel

INVENTOR
Edwin F. Carson.
BY
Frank S. Busser
ATTORNEY

UNITED STATES PATENT OFFICE.

EDWIN F. CARSON, OF PHILADELPHIA, PENNSYLVANIA.

MILK-BOTTLE AND CAP.

1,333,245.  Specification of Letters Patent.  Patented Mar. 9, 1920.

Application filed June 18, 1919. Serial No. 305,020.

*To all whom it may concern:*

Be it known that I, EDWIN F. CARSON, a citizen of the United States, residing at Philadelphia, county of Philadelphia, and State of Pennsylvania, have invented a new and useful Improvement in Milk-Bottles and Caps, of which the following is a full, clear, and exact description, reference being had to the accompanying drawings, which form a part of this specification.

My invention relates to a new and improved form of milk bottle and closure therefor, which will positively protect the milk from contamination.

The present types of milk bottles do not efficiently protect the milk, and the parts of the bottle with which the milk comes in contact on pouring are constantly open to contamination of all kinds, which is taken up by the milk when it is poured.

The object of my invention is to provide a bottle and closure therefor which will not only protect the milk in transit or storage, but which will protect the neck and lips of the bottle, so that no dirt, water or other form of contamination caused by handling can enter the bottle or collect on the surfaces touched by the milk on pouring, the closure being of such a construction that it will be substantially as efficient when wet as when dry and after numerous removals and replacements.

I will now describe my invention in detail in connection with the accompanying drawings, in which—

Figures 1, 2:
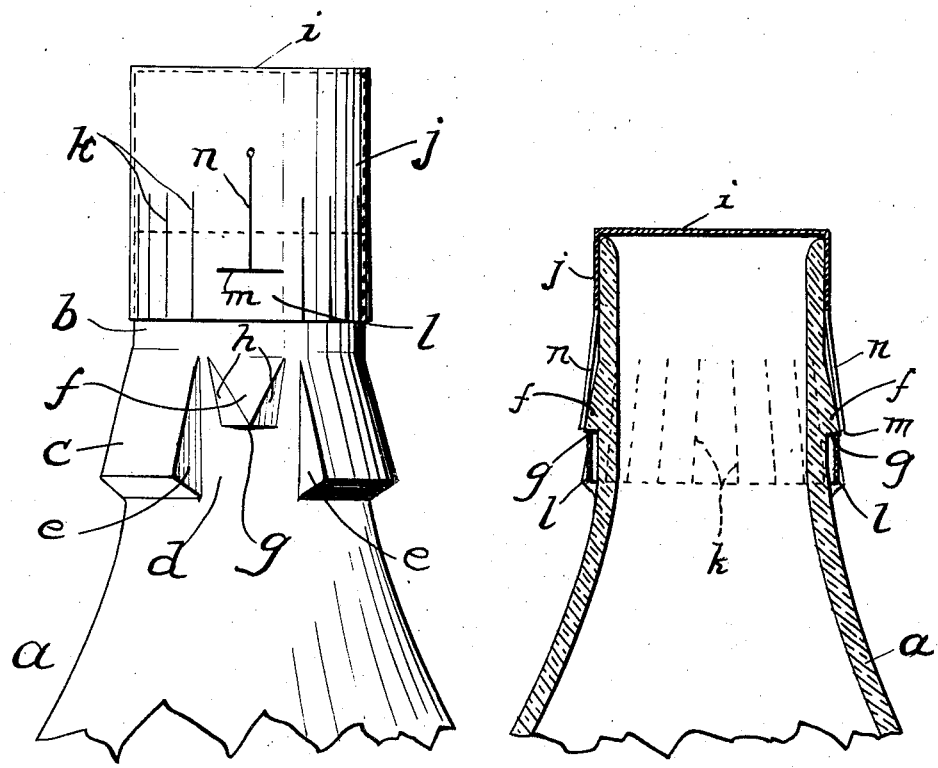
Figure 1 is a side elevation of a bottle and closure embodying my invention.
Fig. 2 is a cross-sectional view of a bottle with closure in position.

Referring to Figs. 1 and 2, which illustrate a preferred embodiment of my invention, the milk bottle $a$, the body of which is of conventional or any desired shape, is provided with a neck comprising the cylindrical portion $b$ and the conical or beveled portion $c$. The conical portion $c$ of the neck is recessed on opposite sides as at $d$, the edges $e$ of the recesses being beveled outwardly.

Centrally of the recesses are located the projections $f$, the body of which conforms to the taper of the conical portion of the neck and forms the downwardly facing shoulder $g$. The edges $h$ are beveled so that the shoulder $g$ is triangular in shape.

The cap $i$ is formed with a cylindrical body portion $j$, around the lower part of which are provided the vertical slits $k$, a pair on opposite sides being spaced at a greater distance than the balance. The tongues $l$ formed by the more widely spaced slits are provided with a horizontal slit $m$ and a vertical slit $n$ extending upwardly from the center of the horizontal slit and forming an inverted T.

Figures 3, 4:
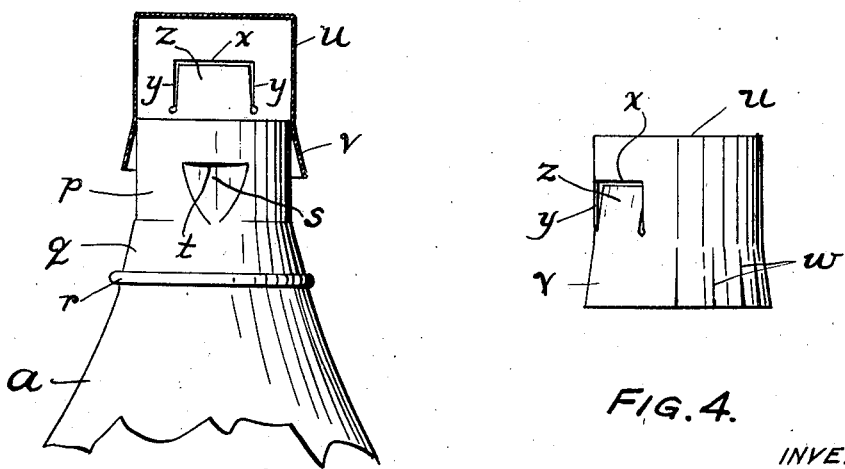
Fig. 3 is a side elevation of a bottle and closure therefor embodying a modification of my invention.
Fig. 4 is an elevation of modified form of closure.

Referring to Figs. 3 and 4, in which I have illustrated a modification of my invention, the bottle, having a body $a$, is provided with a neck comprising a cylindrical portion $p$ and a conical portion $q$. At the juncture of the conical portion of the neck and the body of the bottle is provided a bead $r$. At opposite sides of the neck recesses $s$ are cut in the cylindrical portion, forming the downwardly facing shoulders $t$.

The cap $u$ is provided with a body portion $v$, the lower part or skirt of which is slitted vertically as at $w$. At opposite sides of the cap the body is provided with horizontal slots $x$ from the ends of, and at right angles to which, extend downwardly the slots $y$ forming upwardly extending tongues $z$.

In the operation of the preferred embodiment of my invention, the cap is placed over the neck, so that the tongues $l$ will slip into the recesses $d$. The cap is then pressed firmly down and conforms to the neck of the bottle, the slits $k$ permitting the lower portion to conform to the conical portion of the neck. The inverted T-shaped slot in the tongue $l$ overlies the projection $f$, the lower part of which penetrates the horizontal slot $m$, permitting the tongue to engage shoulder $g$, and hold the cap firmly in place against any removal by a direct pull.

When it is desired to remove the cap, it is given a slight turn to the right or left, the edges of the tongue $l$ slide up on the outwardly beveled edges $e$ of the recesses, disengaging the tongue from the shoulder. The cap may then be readily removed.

In the operation of the modified form shown, the cap is passed down over the neck until the tongues $z$ engage under the downwardly conical shape of the neck because of its slitted lower portion, and the tongues positively prevent removal of the cap by upward pull. The cap is removed by turning it until the tongues are disengaged, when it may be lifted off.

Since the cap presents a smooth outside surface, the bead $r$ is provided as a means of preventing the hand from slipping and possible tearing of the cap when the bottle is lifted.

It will be noted that, due to the shape of the neck and the construction of the cap adapting it to conform to the neck, the surfaces of the bottle coming into contact with the milk will be efficiently and positively protected and the cap will be securely held in place, frictionally which will prevent the entry of dust and water, and by the positive means provided.

Having now fully described my invention, what I claim and desire to protect by Letters Patent is:

1. The combination with a bottle comprising a body portion, of a neck portion partly cylindrical and partly conical, a shoulder in said neck, and a cap comprising a cylindrical body portion, the lower end of which is slit peripherally, to adapt it to conform to the shape of the neck, and having a tongue formed therein for engagement with said shoulder.

2. The combination with a bottle comprising a body portion, of a neck portion partly cylindrical and partly conical, a recess in the conical portion, a projection forming a downwardly facing shoulder in said recess, and a cap the lower portion of the body of which is provided with a plurality of slits, a tongue formed by a pair of said slits, said tongue adapted to enter said recess and provided with a horizontal and a vertical slit in the form of an inverted T adapting said tongue to engage said shoulder.

3. The combination with a bottle comprising a body portion, of a neck portion partly cylindrical and partly conical, said neck being shaped to form a recess and a downwardly facing shoulder, and a cap comprising a cylindrical body portion, the lower end of which is slit and having a tongue formed therein adapted to enter said recess and engage said shoulder.

4. The combination with a bottle comprising a body portion, of a neck portion partly cylindrical and partly conical, a recess in said conical portion, a projection in said recess, said projection having beveled edges and forming a downwardly facing shoulder substantially triangular in cross-section, and a cap comprising a body portion the lower part of which is slit, a tongue, adapted to enter said recess, formed in said cap, said tongue being provided with a vertical and a horizontal slit, whereby it may conform to said projection along said vertical slit and engage said shoulder along said horizontal slit.

5. The combination with a bottle comprising a body portion, of a neck portion partly cylindrical and partly conical, a recess in said neck, the edges of said recess being outwardly beveled, a projection in said recess forming a downwardly facing shoulder, and a cap comprising a body portion the lower part of which is slit, and having a tongue formed in said body adapted to engage said shoulder.

6. The combination with a bottle comprising a body portion, of a neck portion, said neck portion being partly cylindrical and partly tapered, and a cap having a cylindrical body portion the lower end of which is slit peripherally, adapting it to conform to and engage the neck.

7. The combination with a bottle comprising a body portion, of a tapered neck portion, and a cap, having a cylindrical body the lower end of which is slit, adapting it to conform to and tightly engage the neck, thereby maintaining itself in place.

8. The combination with a bottle comprising a body portion, of a neck portion partly cylindrical and partly tapered, and a cap having a cylindrical body portion closed at one end and slit peripherally adjacent its open end to permit it to conform to and engage said neck.

9. The combination with a bottle comprising a body portion, of a neck portion, partly cylindrical and partly tapering and having a recess in the neck, and a cap having a body portion formed to fit over said neck and a tongue to engage said notch.

10. The combination with a bottle comprising a body portion, a neck portion, and a downwardly facing shoulder substantially at the juncture of the neck and body, of a cap adapted to fit over the neck.

11. The combination with a bottle comprising a body portion, of a neck partly cylindrical and partly tapered, the tapered portion being provided with a recess, a projection, affording a shoulder, positioned in said recess, and a cylindrical cap adapted to conform to said neck and provided with a tongue adapted to engage said shoulder.

In testimony of which invention I have hereunto set my hand at Philadelphia, Pa., on this tenth day of June, 1919.

EDWIN F. CARSON.